United States Patent
Shono et al.

(10) Patent No.: US 10,921,425 B2
(45) Date of Patent: Feb. 16, 2021

(54) RADAR DEVICE AND CONTROL METHOD OF RADAR DEVICE

(71) Applicant: DENSO TEN Limited, Kobe (JP)

(72) Inventors: Masayoshi Shono, Kobe (JP); Chiyo Hirata, Kobe (JP); Daisuke Ikeda, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 212 days.

(21) Appl. No.: 16/113,326

(22) Filed: Aug. 27, 2018

(65) Prior Publication Data

US 2019/0101618 A1 Apr. 4, 2019

(30) Foreign Application Priority Data

Sep. 29, 2017 (JP) ................. 2017-189843

(51) Int. Cl.
| | | |
|---|---|---|
| *G01S 7/40* | (2006.01) | |
| *G01S 13/34* | (2006.01) | |
| *G01S 7/35* | (2006.01) | |
| *G01S 13/00* | (2006.01) | |

(52) U.S. Cl.
CPC ............ *G01S 7/40* (2013.01); *G01S 7/352* (2013.01); *G01S 7/4008* (2013.01); *G01S 7/4021* (2013.01); *G01S 13/343* (2013.01)

(58) Field of Classification Search
CPC ........ G01S 7/40; G01S 13/343; G01S 7/4021; G01S 7/4008; G01S 7/354; G01S 13/345; G01S 7/352
See application file for complete search history.

(56) References Cited

U.S. PATENT DOCUMENTS

| | | | | |
|---|---|---|---|---|
| 5,619,208 A | * | 4/1997 | Tamatsu | G01S 13/345 342/115 |
| 5,963,163 A | * | 10/1999 | Kemkemian et al. | G01S 13/343 342/109 |
| 6,320,531 B1 | * | 11/2001 | Tamatsu | G01S 13/343 342/109 |
| 8,085,184 B2 | * | 12/2011 | Takabayashi | G01S 13/343 342/70 |
| 8,232,914 B2 | * | 7/2012 | Kuroda | G01S 7/354 342/118 |
| 2002/0190894 A1 | * | 12/2002 | Mitsumoto | G01S 7/354 342/70 |
| 2005/0264439 A1 | * | 12/2005 | Enomoto | G01S 7/352 342/109 |

FOREIGN PATENT DOCUMENTS

| | | |
|---|---|---|
| JP | 2004-347362 A | 12/2004 |
| JP | 2005-338035 A | 12/2005 |

* cited by examiner

*Primary Examiner* — Bernarr E Gregory
(74) *Attorney, Agent, or Firm* — Oliff PLC

(57) ABSTRACT

There is provided a radar device. A transmitting unit transmits a transmitted wave based on a transmitted signal which is frequency modulated. A receiving unit acquires a received signal based on a reflected wave which is the transmitted wave reflected by a target. An instruction unit matches a predetermined timing at which a frequency of the transmitted signal becomes a predetermined frequency to an output timing at which a beat signal based on the transmitted signal and the received signal is output from the receiving unit and outputs the beat signal from the receiving unit.

14 Claims, 10 Drawing Sheets

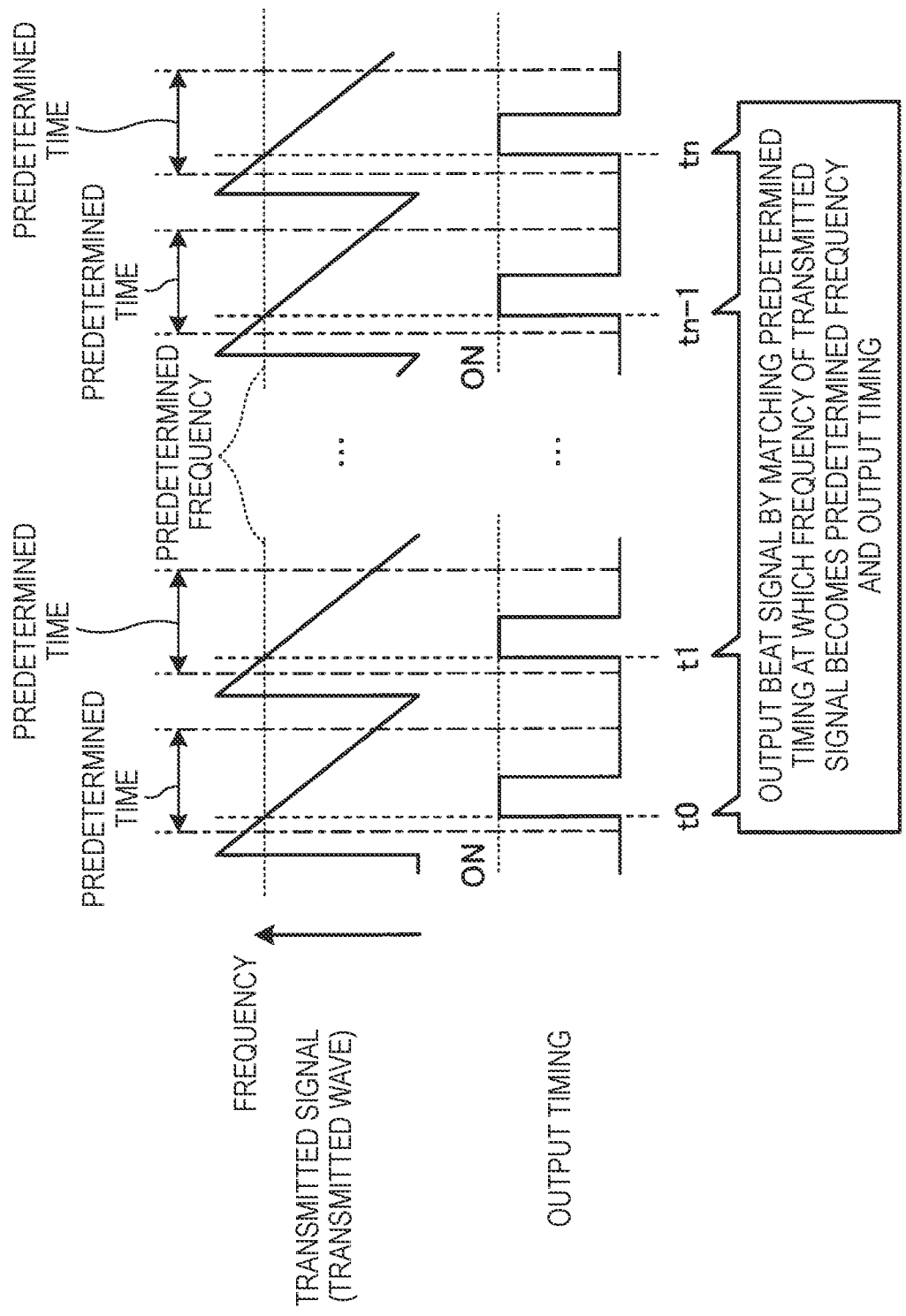

RADAR DEVICE AND CONTROL METHOD OF RADAR DEVICE

CROSS-REFERENCE TO RELATED APPLICATIONS

This application is based on and claims priority under 35 USC 119 from Japanese Patent Application No. 2017-189843 filed on Sep. 29, 2017.

BACKGROUND

Technical Field

The present disclosure relates to a radar device and a control method of the radar device.

Conventionally, there has been known a radar device which transmits a transmitted wave based on a transmitted signal whose frequency is modulated at a predetermined cycle and outputs a beat signal corresponding to a frequency difference between the transmitted signal and a received signal based on a reflected wave synchronously with the predetermined cycle (for example, see Patent Document 1).

Patent Document

Patent Document 1: JP-A-2004-347362

SUMMARY

However, the above described radar device does not describe a method of setting a timing of outputting the beat signal. In the above described radar device, for example, when the predetermined cycle in the transmitted wave is shortened, a predetermined period in which the beat signal can be output at the optimum timing is shortened, and the predetermined period may deviate from the timing of outputting the beat signal. Therefore, detection accuracy of a target in the radar device may decrease.

It is therefore an object of the disclosure to provide a radar device and a control method of a radar device which improve detection accuracy of a target.

According to an aspect of the embodiments of the present invention, there is provided a radar device including: a transmitting unit which transmits a transmitted wave based on a transmitted signal which is frequency modulated; a receiving unit which acquires a received signal based on a reflected wave which is the transmitted wave reflected by a target; and an instruction unit which matches a predetermined timing at which a frequency of the transmitted signal becomes a predetermined frequency to an output timing at which a beat signal based on the transmitted signal and the received signal is output from the receiving unit and outputs the beat signal from the receiving unit.

According to an aspect of the embodiment, the detection accuracy of a target can be improved.

BRIEF DESCRIPTION OF DRAWINGS

Exemplary embodiments of the present invention will be described in detail based on the following figures, wherein:

FIG. 1B is a diagram illustrating the transmitted signal and the output timing in a radar device according to an embodiment;

DETAILED DESCRIPTION

Hereinafter, a radar device and a control method of the radar device disclosed in the present application will be described with reference to the accompanying drawings. It should be noted that the invention is not limited to the following embodiments.

Hereinafter, a case where the radar device is of a Fast-Chirp Modulation (FCM) method will be described as an example, but the radar device may be of another method, such as a Frequency Modulated Continuous Wave (FM-CW) method. In the FCM type radar device, a chirp wave whose frequency continuously increases or decreases is transmitted as a transmitted wave.

The radar device is mounted in, for example, a front grille of a vehicle and detects targets (e.g., other vehicles (vehicles), bicycles, and pedestrians (people)) present in a traveling direction of a host vehicle. The radar device may be mounted on other places such as a front windshield, a rear grille, and left and right side portions (e.g., left and right door mirrors). Further, besides the vehicle, the radar device may be mounted on an airplane, a ship, or the like.

The radar device transmits a transmitted wave based on a transmitted signal and acquires a received signal based on a reflected wave which is the transmitted wave reflected by a target. Then, the radar device generates a beat signal based on the transmitted signal and the received signal, outputs the generated beat signal from a receiving unit, and calculates a distance to the target, an angle of the target, or the like based on the beat signal.

In order to improve the detection accuracy of the target, the radar device must output the beat signal within a predetermined period in which the target can be detected with high accuracy.

In a conventional radar device, a chirp time which is a transmission cycle of one chirp wave and an output timing at which the beat signal is output from the receiving unit are set based on different reference signals.

Figure 1A:
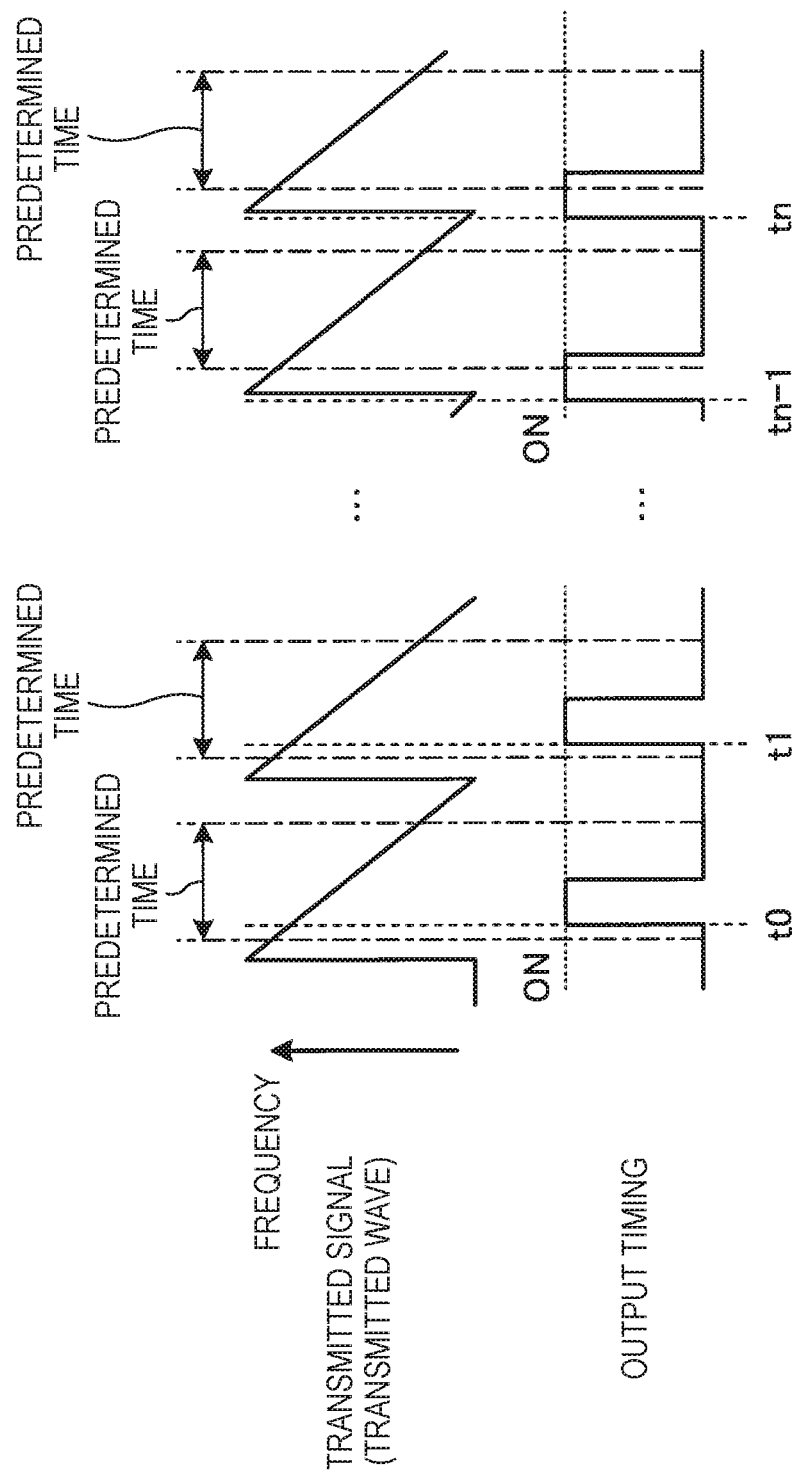
FIG. 1A is a diagram illustrating a transmitted signal and an output timing in a conventional radar device.

Therefore, for example, as shown in FIG. 1A, even when the output timing of the beat signal at times t0, t1 in the chirp wave is synchronized with the chirp wave so as to be within the predetermined period, the output timing of the beat signal may be out of the predetermined period at times tn−1, to when a modulation timing of the transmitted signal is changed. That is, the output timing may deviate from the predetermined period. FIG. 1A is a diagram illustrating the transmitted signal and the output timing in the conventional radar device.

Even when the transmission cycle matches the output timing at each predetermined time, the above-described deviation may occur when the number of times of modulation increases. In particular, a deviation easily occurs in the FCM type radar device in which the transmission cycle of one chirp wave is short. Even if the chirp wave transmitted at first is synchronized with the output timing of the beat signal, a deviation may occur between the chirp wave and the output timing of the beat signal by for example, an accumulation of clock deviation when a plurality of chirp waves are continuously transmitted. Therefore, the detection accuracy of the target may decrease in the conventional radar device.

Therefore, as shown in FIG. 1B, the radar device 1 (see FIG. 2) according to the embodiment outputs the beat signal from the receiving unit 3 (see FIG. 2) by matching a predetermined timing at which the frequency of the transmitted signal becomes a predetermined frequency to the output timing. FIG. 1B is a diagram illustrating the transmitted signal and the output timing in the radar device 1 according to the embodiment.

The predetermined frequency is a frequency set in advance and a frequency within the predetermined period. In a radar device which transmits the chirp wave whose frequency continuously decreases as a transmitted wave, the predetermined timing is a timing at which the frequency becomes the predetermined frequency when the frequency decreases. On the other hand, in a radar device which transmits the chirp wave whose frequency continuously increases as a transmitted wave, the predetermined timing is a timing at which the frequency becomes the predetermined frequency when the frequency increases.

Accordingly, it is possible to prevent a deviation between the predetermined period and the output timing. Therefore, the radar device 1 according to the embodiment can improve the detection accuracy of the target.

First Embodiment

Figure 2:
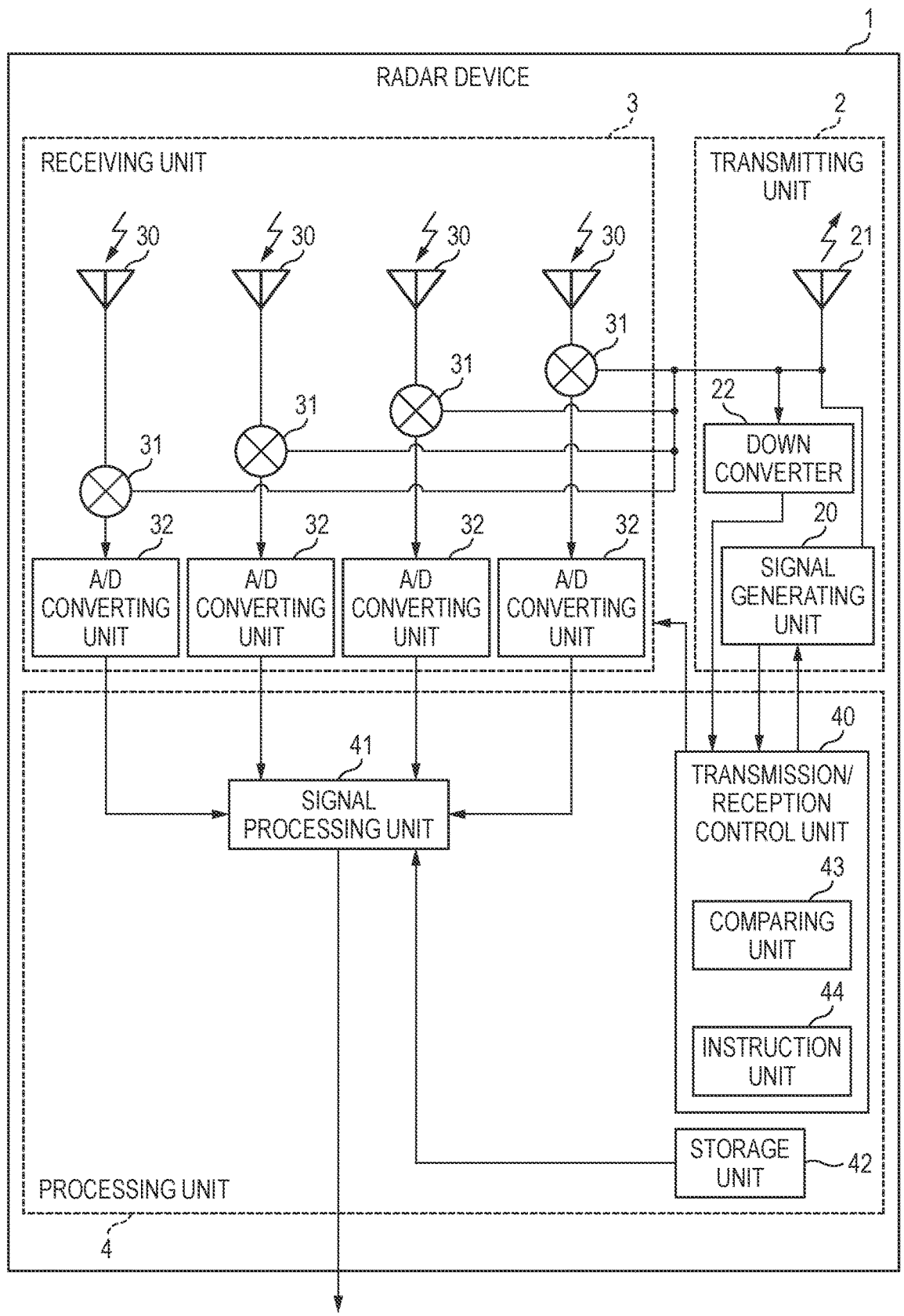
FIG. 2 is a block diagram showing a configuration of a radar device according to a first embodiment.

Next, the radar device 1 according to a first embodiment will be described with reference to FIG. 2. FIG. 2 is a block diagram showing a configuration of the radar device 1 according to the first embodiment.

The radar device 1 includes a transmitting unit 2, a receiving unit 3, and a processing unit 4. The transmitting unit 2 includes a signal generating unit 20, a transmitting antenna 21, and a down converter 22.

Figure 3:
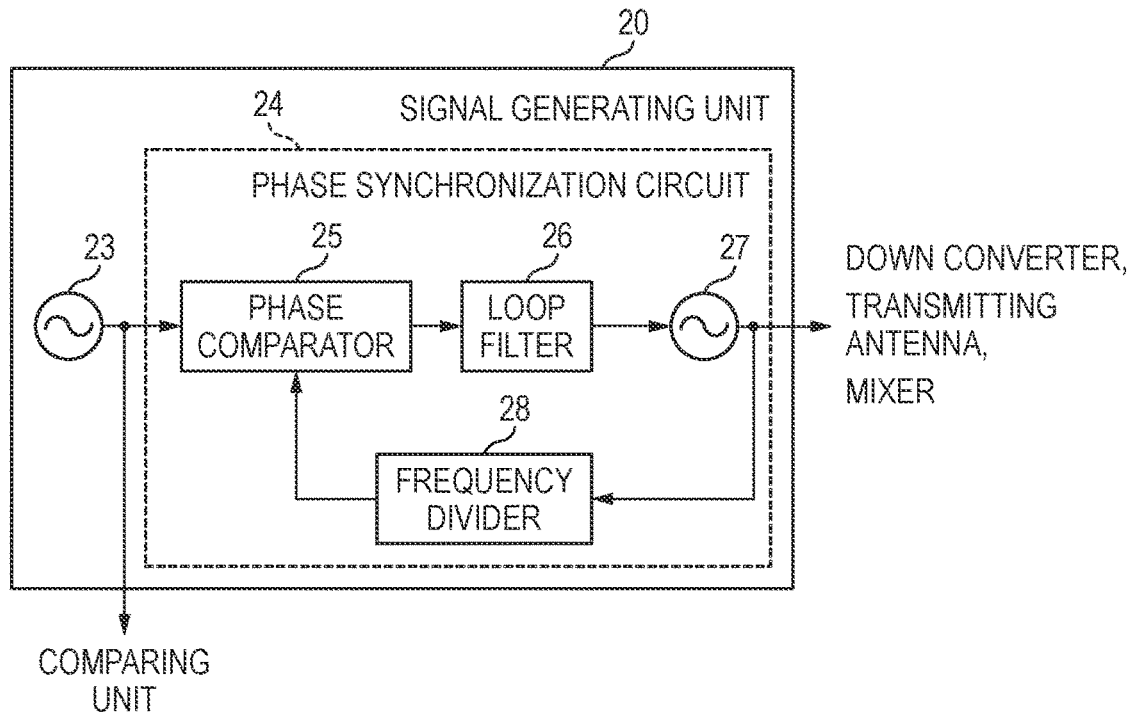
FIG. 3 is a block diagram showing a configuration of a signal generating unit according to the first embodiment.

The signal generating unit 20 will be described with reference to FIG. 3. FIG. 3 is a block diagram showing a configuration of the signal generating unit 20 according to the first embodiment. The signal generating unit 20 generates the transmitted signal for transmitting the transmitted wave which is the chirp wave under the control of a transmission/reception control unit 40 which will be described later.

The signal generating unit 20 includes a reference signal oscillator 23 and a phase synchronization circuit 24. The reference signal oscillator 23 generates a reference signal. The reference signal oscillator 23 is, for example, an oscillator using a crystal resonator. The reference signal oscillator 23 outputs the generated reference signal to the phase synchronization circuit 24 and a comparing unit 43 which will be described later.

The phase synchronization circuit 24 includes a phase comparator 25, a loop filter 26, a voltage-controlled oscillator 27, and a frequency divider 28.

The phase comparator 25 detects a phase difference between the reference signal output from the reference signal oscillator 23 and a frequency-divided signal output from the frequency divider 28 and generates and outputs signals corresponding to the phase difference. The loop filter 26 is, for example, a low-pass filter, averages the signals output by the phase comparator 25, and outputs a control voltage which is a DC signal.

The voltage-controlled oscillator 27 oscillates at a frequency corresponding to the control voltage and generates a transmitted signal synchronized with a phase of the reference signal. The voltage-controlled oscillator 27 outputs the generated transmitted signal to the frequency divider 28, the transmitting antenna 21, the down converter 22, and mixers 31 which will be described later.

The frequency divider 28 outputs a frequency-divided signal in which a frequency of the transmitted signal is reduced to 1/integer to the phase comparator 25.

Returning to FIG. 2, the transmitting antenna 21 converts the transmitted signal output from the voltage-controlled oscillator 27 (see FIG. 3) of the signal generating unit 20 into the transmitted wave and outputs the transmitted wave to the outside. The transmitted wave output by the transmitting antenna 21 is a continuous wave in which the chirp wave is continuous. The transmitted wave transmitted from the transmitting antenna 21 to the outside is reflected by the target and becomes the reflected wave.

The down converter 22 down-converts the transmitted signal into a low-frequency signal. Incidentally, the down converter 22 may be provided outside the transmitting unit 2.

The receiving unit 3 includes a plurality of receiving antennas 30 forming an array antenna, a plurality of mixers 31, and a plurality of A/D converting units 32. The mixer 31 and the A/D converting unit 32 are provided for each receiving antenna 30.

Each receiving antenna 30 receives the reflected wave from the target as a received wave, converts the received wave into the received signal, and outputs the received signal to the mixer 31. The number of receiving antennas 30 shown in FIG. 2 is four, but the number may be three or less or five or more.

The received signal output from the receiving antenna 30 is amplified by an amplifier (for example, a low noise amplifier) (not shown) and then input to the mixer 31. The mixer 31 mixes a part of the transmitted signal and the received signal input from the receiving antenna 30, removes unnecessary signal components, and generates the beat signal.

The beat signal is a differential wave of the transmitted wave and the reflected wave and has a beat frequency which is a difference between the frequency of the transmitted signal and a frequency of the received signal.

The A/D converting unit 32 captures the beat signal from the mixer 31 based on a sampling signal from the transmission/reception control unit 40, converts the beat signal into a digital signal, and outputs the converted beat signal to the processing unit 4. The sampling signal is generated in accordance with the predetermined timing at which the frequency of the transmitted signal becomes the predetermined frequency.

The processing unit 4 includes the transmission/reception control unit 40, a signal processing unit 41, and a storage unit 42.

The processing unit 4 is, for example, a microcomputer including a Central Processing Unit (CPU), a Read Only Memory (ROM) corresponding to the storage unit 42, a Random Access Memory (RAM), a register, other input/output ports, or the like, and controls the entire radar device 1.

The processing unit 4 functions as the transmission/reception control unit 40 and the signal processing unit 41 by reading and executing a program stored in the ROM by the CPU of the microcomputer. Both of the transmission/reception control unit 40 and the signal processing unit 41 can be configured by hardware such as an Application Specific Integrated Circuit (ASIC) or a Field Programmable Gate Array (FPGA).

The transmission/reception control unit 40 includes the comparing unit 43 and an instruction unit 44.

The comparing unit 43 compares a frequency of the reference signal output from the reference signal oscillator 23 (see FIG. 3) of the signal generating unit 20 with a frequency of the signal output from the down converter 22, and determines whether the predetermined timing at which the frequency of the transmitted signal becomes the predetermined frequency is reached. When a value obtained by multiplying the frequency of the reference signal by a predetermined value matches the frequency of the signal output from the down converter 22, the comparing unit 43 determines that the predetermined timing at which the frequency of the transmitted signal becomes the predetermined frequency is reached. The predetermined value is set according to the predetermined frequency. Accordingly, the comparing unit 43 detects the predetermined timing at which the frequency of the transmitted signal becomes the predetermined frequency.

The instruction unit 44 controls the signal generating unit 20 of the transmitting unit 2 to output an instruction signal for generating the transmitted signal and outputs the transmitted signal from the voltage-controlled oscillator 27 (see FIG. 3) of the signal generating unit 20. Accordingly, a transmitted signal whose frequency continuously changes according to elapsed time is output from the voltage-controlled oscillator 27 to the transmitting antenna 21. Further, the instruction unit 44 can set a waveform of the chirp wave by controlling the signal generating unit 20. The instruction unit 44 can set the waveform of the chirp wave by setting a chirp time which is the transmission cycle of one chirp wave and a modulation width which is a difference between a maximum frequency and a minimum frequency (a reference frequency) of the chirp wave.

Based on the frequency of the reference signal output from the reference signal oscillator 23 of the signal generating unit 20 and the frequency of the signal output from the down converter 22, the instruction unit 44 makes the A/D converting unit 32 capture the beat signal and generates the sampling signal for outputting the beat signal from the receiving unit 3. Specifically, the instruction unit 44 generates the sampling signal such that the beat signal is output from the receiving unit 3 in accordance with the predetermined timing detected by the comparing unit 43. That is, the instruction unit 44 sets an output timing which matches the predetermined timing.

Generating the sampling signal includes adjusting the reference signal of the sampling signal in accordance with the predetermined timing.

The instruction unit 44 outputs the sampling signal to the A/D converting unit 32 and makes the A/D converting unit 32 capture the beat signal based on the sampling signal, that is, in accordance with the predetermined timing and outputs the beat signal from the A/D converting unit 32. Accordingly, the beat signal is output from the A/D converting unit 32 in accordance with the predetermined timing.

The instruction unit 44 detects the predetermined timing for each chirp wave and outputs the sampling signal at the predetermined timing for each chirp wave. Therefore, in each chirp wave, the predetermined timing is synchronized with the output timing.

The instruction unit 44 may synchronize a timing at which the frequency of the chirp wave is lowered by modulation, that is, the timing at which the predetermined period starts, with a timing at which the A/D converting unit 32 A/D converts the received signal. Even in this case, the predetermined timing can be synchronized with the output timing in each chirp wave. Further, by using the timing at which the frequency of the chirp wave is lowered by modulation, the period of the A/D conversion can be sufficiently ensured.

The signal processing unit 41 performs Fast Fourier Transform (FFT) twice on the beat signal output from each A/D converting unit 32 to detect a distance and a relative velocity of the target. Further, the signal processing unit 41 estimates an angle at which the target is present by using a predetermined direction calculation processing, such as a known arriving direction estimation method of Estimation of Signal Parameters via Rotational Invariance Techniques (ESPRIT).

Figure 4:
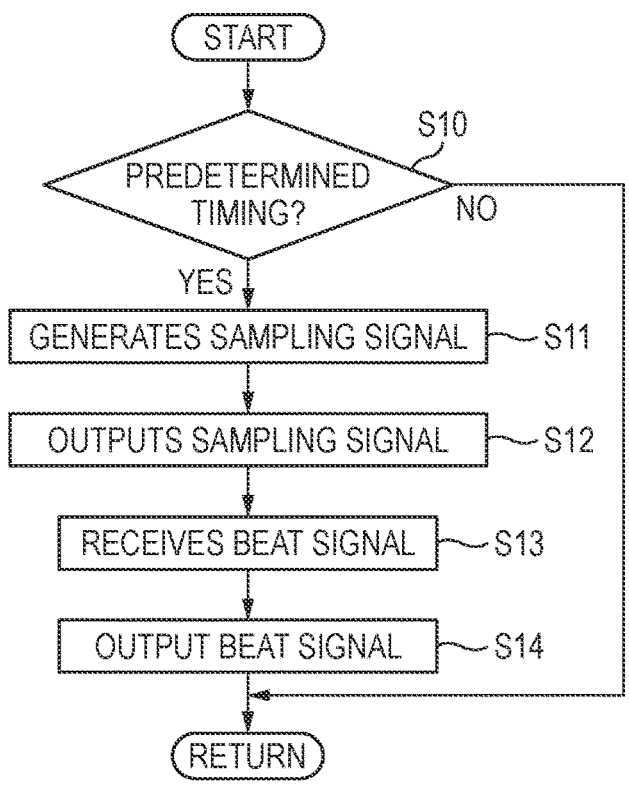
FIG. 4 is a flowchart illustrating synchronization control in the radar device according to the first embodiment.

Next, synchronization control in the radar device 1 according to the first embodiment will be described using a flowchart of FIG. 4. FIG. 4 is a flowchart illustrating the synchronization control in the radar device 1 according to the first embodiment.

The transmission/reception control unit 40 determines whether the predetermined timing at which the frequency of the transmitted signal becomes the predetermined frequency is reached (S10).

When the predetermined timing is reached (S10: Yes), the transmission/reception control unit 40 generates the sampling signal (S11). Then, the transmission/reception control unit 40 outputs the sampling signal to the A/D converting unit 32 (S12).

Accordingly, the A/D converting unit 32 captures the beat signal based on the sampling signal, that is, in accordance with the predetermined timing (S13) and outputs the beat signal converted into the digital signal to the signal processing unit 41 (S14).

When it is not the predetermined timing (S10: No), the transmission/reception control unit 40 ends the current processing.

Next, effects of the radar device 1 according to the first embodiment will be described.

The radar device 1 outputs the beat signal from the receiving unit 3 by matching the predetermined timing to the output timing. Specifically, the radar device 1 sets the output timing in accordance with the predetermined timing and outputs the beat signal from the receiving unit 3 at the set output timing. Accordingly, the radar device 1 can prevent the deviation between the predetermined period in which the target can be detected with high accuracy and the output timing and can improve the detection accuracy of the target. Particularly, in the radar device 1 which transmits the chirp wave whose frequency continuously increases or decreases as the transmitted wave, it is possible to prevent the deviation between the predetermined period and the output timing, thereby improving the detection accuracy of the target.

It is also conceivable to use components with high accuracy such that the predetermined period does not deviate from the output timing, but in this case, the cost of the radar device increases. In contrast, the radar device 1 can prevent the deviation between the predetermined period and the output timing without using the components with high accuracy. Therefore, the radar device 1 can improve the detection accuracy of the target while reducing the cost. Further, even when the radar device 1 generates the transmitted signal and the sampling signal based on different reference signals, it is possible to prevent the deviation between the predetermined period and the output timing and to increase a degree of freedom of a layout.

In addition, it is also conceivable to lengthen the predetermined period such that the predetermined period does not deviate from the output timing, but in this case, the output time of the transmitted wave in the transmitting unit becomes long, which may increase the amount of heat generated in the radar device. Therefore, heat resistant components and a device for heat radiation are required, and the cost is increased. In contrast, the radar device 1 can prevent the deviation between the predetermined period and the output timing without increasing the predetermined period. Therefore, the radar device 1 can improve the detection accuracy of the target while reducing the cost.

Further, the radar device 1 sets the output timing based on the frequency obtained by down-converting the transmitted signal and the frequency of the reference signal of the phase synchronization circuit 24. Accordingly, the radar device 1 can detect the predetermined timing at which the frequency of the transmitted signal becomes the predetermined frequency.

Second Embodiment

Figure 5:
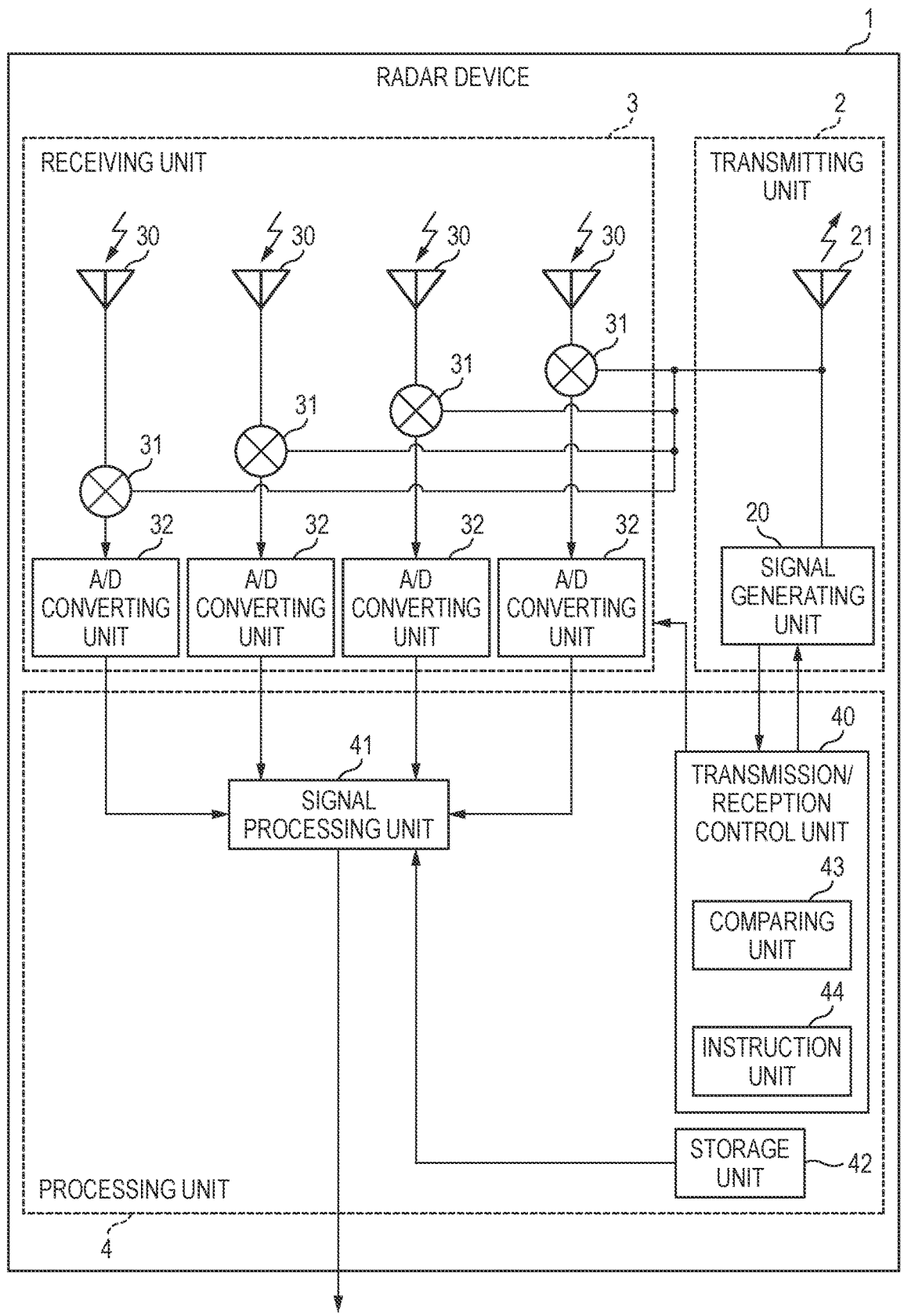
FIG. 5 is a block diagram showing a configuration of the radar device according to a second embodiment.
Figure 6:
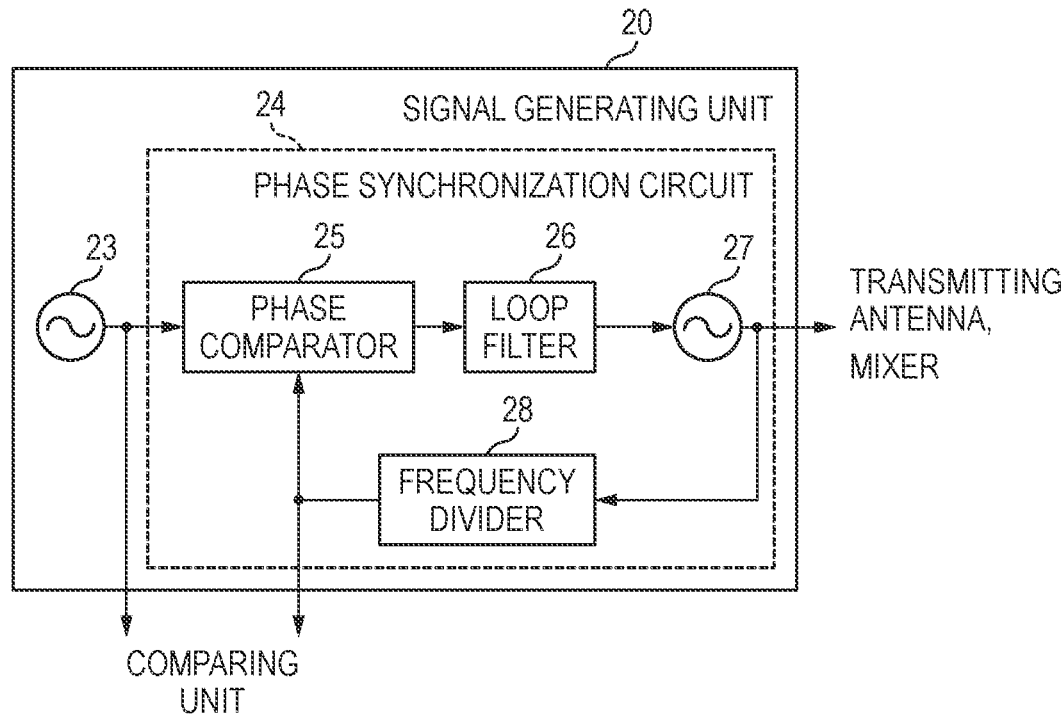
FIG. 6 is a block diagram showing a configuration of the signal generating unit according to the second embodiment.

Next, a radar device 1 according to a second embodiment will be described with reference to FIGS. 5 and 6. FIG. 5 is a block diagram showing a configuration of the radar device 1 according to the second embodiment. FIG. 6 is a block diagram showing a configuration of the signal generating unit 20 according to the second embodiment. In the radar device 1 according to the second embodiment, the same reference numerals as those of the radar device 1 according to the first embodiment are given to the same configurations as those of the radar device 1 according to the first embodiment, and a detailed description thereof will be omitted.

The radar device 1 according to the second embodiment is different from the radar device 1 according to the first embodiment in that the radar device 1 does not include the down converter 22.

The signal generating unit 20 outputs the transmitted signal from the voltage-controlled oscillator 27 to the transmitting antenna 21 and the mixers 31, and outputs the frequency-divided signal from the frequency divider 28 to the phase comparator 25 and the comparing unit 43.

The comparing unit 43 compares the frequency of the reference signal output from the reference signal oscillator 23 of the signal generating unit 20 with the frequency of the frequency-divided signal output from the frequency divider 28, and determines whether the predetermined timing at which the frequency of the transmitted signal becomes the predetermined frequency is reached. When a value obtained by multiplying the frequency of the reference signal by an integer by the frequency divider 28 matches the frequency of the frequency-divided signal, the comparing unit 43 determines that the predetermined timing is reached. Accordingly, the comparing unit 43 detects the predetermined timing at which the frequency of the transmitted signal becomes the predetermined frequency.

The instruction unit 44 generates the sampling signal based on the frequency of the reference signal output from the reference signal oscillator 23 and the frequency of the frequency-divided signal output from the frequency divider 28. Specifically, the instruction unit 44 generates the sampling signal in accordance with the predetermined timing. Accordingly, the instruction unit 44 sets the output timing of the beat signal in the receiving unit 3 and outputs the beat signal from the receiving unit 3.

Next, effects of the radar device 1 according to the second embodiment will be described.

The radar device 1 sets the output timing based on the frequency of the reference signal output from the reference signal oscillator 23 and the frequency of the frequency-divided signal output from the frequency divider 28. Accordingly, the radar device 1, for example, can detect the predetermined timing without using the down-converter 22. Therefore, the radar device 1 can obtain the same effects as those of the radar device 1 according to the first embodiment, for example, improving the detection accuracy of the target while simplifying the configuration with respect to that of the radar device 1 according to the first embodiment.

Third Embodiment

Figure 7:
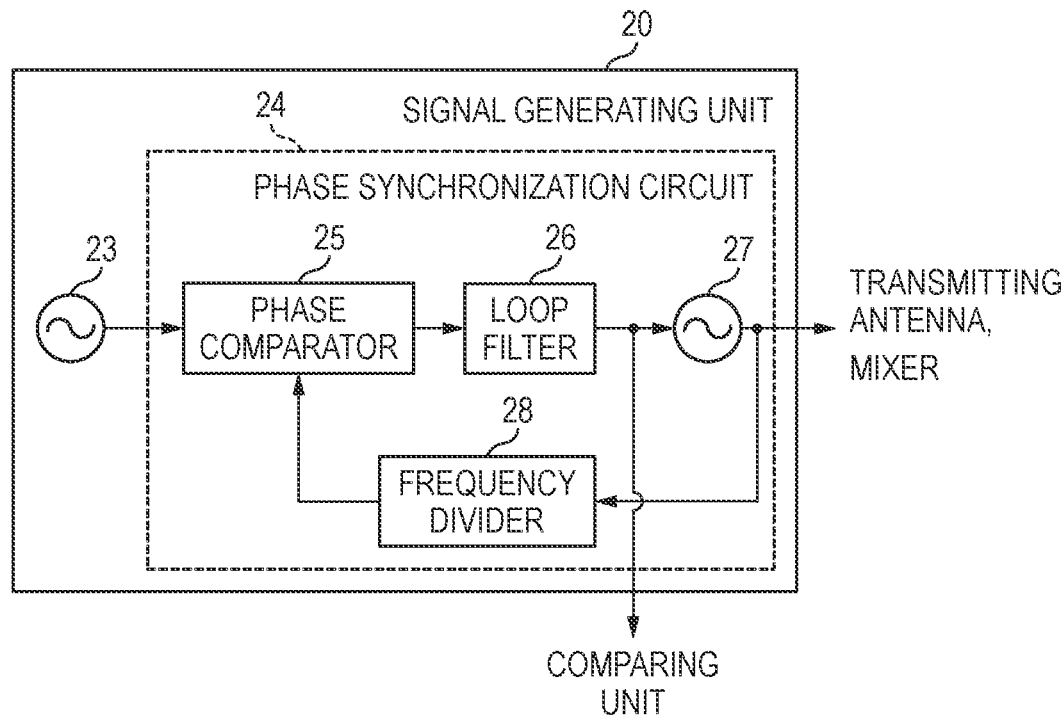
FIG. 7 is a block diagram showing a configuration of the signal generating unit according to a third embodiment.

Next, the radar device 1 according to a third embodiment will be described with reference to FIG. 7. FIG. 7 is a block diagram showing a configuration of the signal generating unit 20 according to the third embodiment. In the radar device 1 according to the third embodiment, the same reference numerals as those of the radar device 1 according to the second embodiment are given to the same configurations as those of the radar device 1 according to the second embodiment (the first embodiment), and a detailed description thereof will be omitted. An overall configuration of the radar device 1 according to the third embodiment is the same as that of the radar device 1 according to the second embodiment.

The signal generating unit 20 outputs the control voltage from the loop filter 26 to the voltage-controlled oscillator 27 and the comparing unit 43.

The comparing unit 43 compares the control voltage output from the loop filter 26 with a predetermined voltage, and determines whether the predetermined timing at which the frequency of the transmitted signal becomes the predetermined frequency is reached. The predetermined voltage is a voltage at which the frequency of the transmitted signal becomes the predetermined frequency. The comparing unit 43 determines that the predetermined timing when the control voltage matches the predetermined voltage is reached. Accordingly, the comparing unit 43 detects the predetermined timing at which the frequency of the transmitted signal becomes the predetermined frequency.

The instruction unit 44 generates the sampling signal based on the control voltage. Specifically, the instruction unit 44 generates the sampling signal in accordance with the predetermined timing. Accordingly, the instruction unit 44 sets the output timing of the beat signal in the receiving unit 3 and outputs the beat signal from the receiving unit 3.

Effects of the radar device 1 according to the third embodiment will be described.

The radar device 1 sets the output timing based on the control voltage corresponding to the frequency of the transmitted signal. Accordingly, the radar device 1 can obtain the same effects as those of the radar device 1 according to the first embodiment, for example, improving the detection accuracy of the target, while simplifying the configuration with respect to that of the radar device 1 according to the first embodiment.

Fourth Embodiment

Figure 8:
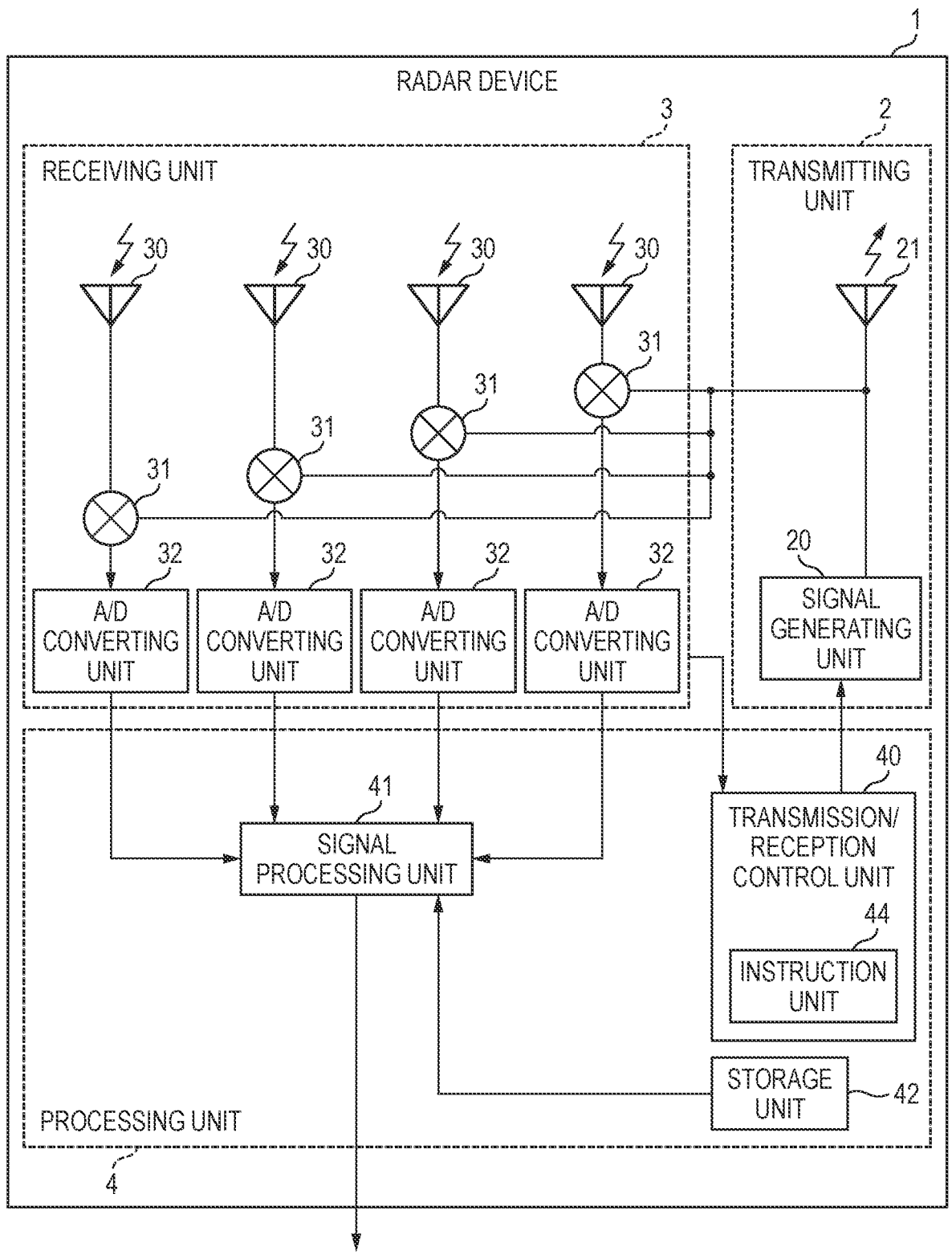
FIG. 8 is a block diagram showing a configuration of the radar device according to a fourth embodiment.
Figure 9:
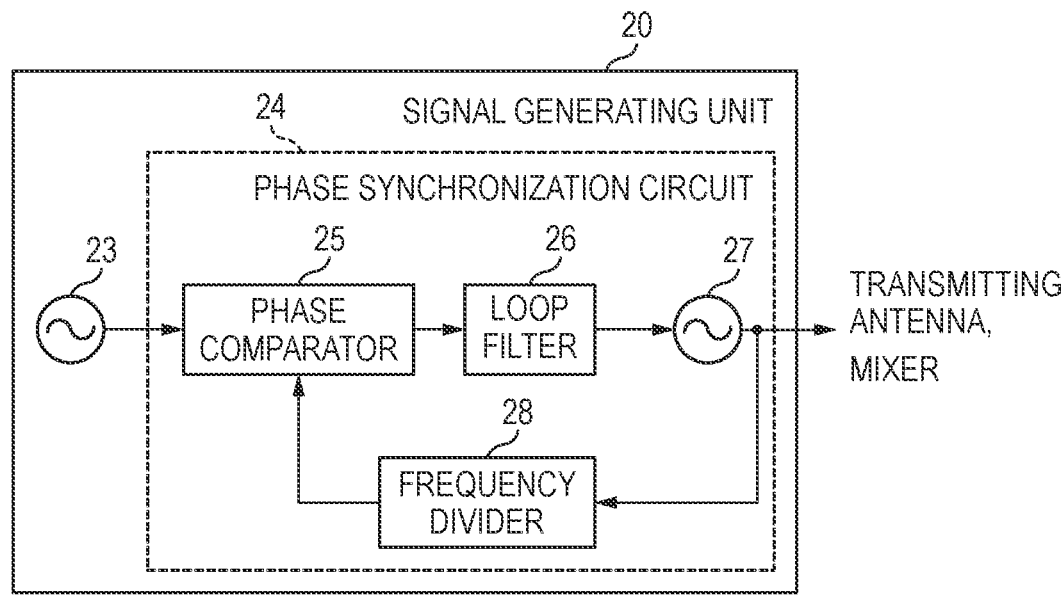
FIG. 9 is a block diagram showing a configuration of a signal generating unit according to a fourth embodiment.

Next, a radar device 1 according to a fourth embodiment will be described with reference to FIGS. 8 and 9. FIG. 8 is a block diagram showing a configuration of the radar device 1 according to the fourth embodiment. FIG. 9 is a block diagram showing a configuration of the signal generating unit 20 according to the fourth embodiment. In the radar device 1 according to the fourth embodiment, the same reference numerals as those of the radar device 1 according to the second embodiment are given to the same configurations as those of the radar device 1 according to the second embodiment (the first embodiment), and a detailed description thereof will be omitted.

The radar device 1 according to the fourth embodiment is different from the radar device 1 according to the second embodiment in that the transmission/reception control unit 40 does not include the comparing unit 43. The signal generating unit 20 according to the fourth embodiment is different from the signal generating unit 20 according to the second embodiment in that a signal is not output to the transmission/reception control unit 40.

In the radar device 1 according to the fourth embodiment, the timing at which the sampling signal for capturing the beat signal is generated by the A/D converting unit 32, that is, the output timing at which the beat signal is output from the receiving unit 3 is set in advance.

The instruction unit 44 makes the signal generating unit 20 generate the transmitted signal based on the sampling signal for capturing the beat signal by the A/D converting unit 32. Specifically, the instruction unit 44 sets the predetermined timing at which the frequency of the transmitted signal becomes the predetermined frequency in accordance with the output timing and sets a modulation waveform of the transmitted signal, that is, the waveform of the chirp wave. The instruction unit 44 sets the chirp time and the modulation width such that the predetermined timing is reached at the output timing. The instruction unit 44 generates the instruction signal, outputs the instruction signal to the signal generating unit 20, and makes the signal generating unit 20 generate the transmitted signal.

The signal generating unit 20 generates the transmitted signal based on the instruction signal from the instruction unit 44. Accordingly, the output timing is synchronized with the predetermined timing.

Figure 10:
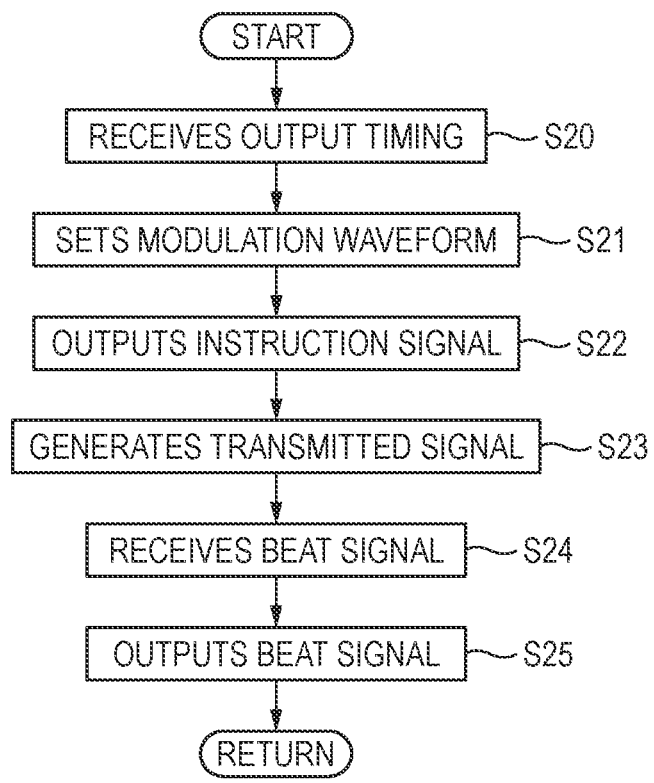
FIG. 10 is a flowchart illustrating the synchronization control in the radar device according to the fourth embodiment.

Next, synchronization control in the radar device 1 according to the fourth embodiment will be described using a flowchart of FIG. 10. FIG. 10 is a flowchart illustrating the synchronization control in the radar device 1 according to the fourth embodiment.

The transmission/reception control unit 40 captures the output timing (S20) and sets the modulation waveform of the transmitted signal such that the predetermined timing is reached at the output timing based on the sampling signal for capturing the beat signal by the A/D converting unit 32 of the receiving unit 3 (S21).

The transmission/reception control unit 40 outputs the instruction signal which becomes the modulation waveform set by the transmitted signal (S22). The signal generating unit 20 generates the transmitted signal based on the instruction signal (S23).

The A/D converting unit 32 captures the beat signal based on the sampling signal (S24) and outputs the beat signal converted into the digital signal to the signal processing unit 41 (S25).

Effects of the radar device 1 according to the fourth embodiment will be described.

The radar device 1 sets the predetermined timing in accordance with the output timing. Specifically, the radar device 1 generates the modulation waveform of the transmitted signal, that is, the chirp wave of the transmitted wave at the output timing such that the predetermined timing is reached at the output timing. Accordingly, the radar device 1 can obtain the same effects as those of the radar device 1 according to the first embodiment, for example, improving the detection accuracy of the target.

Fifth Embodiment

Figure 11:
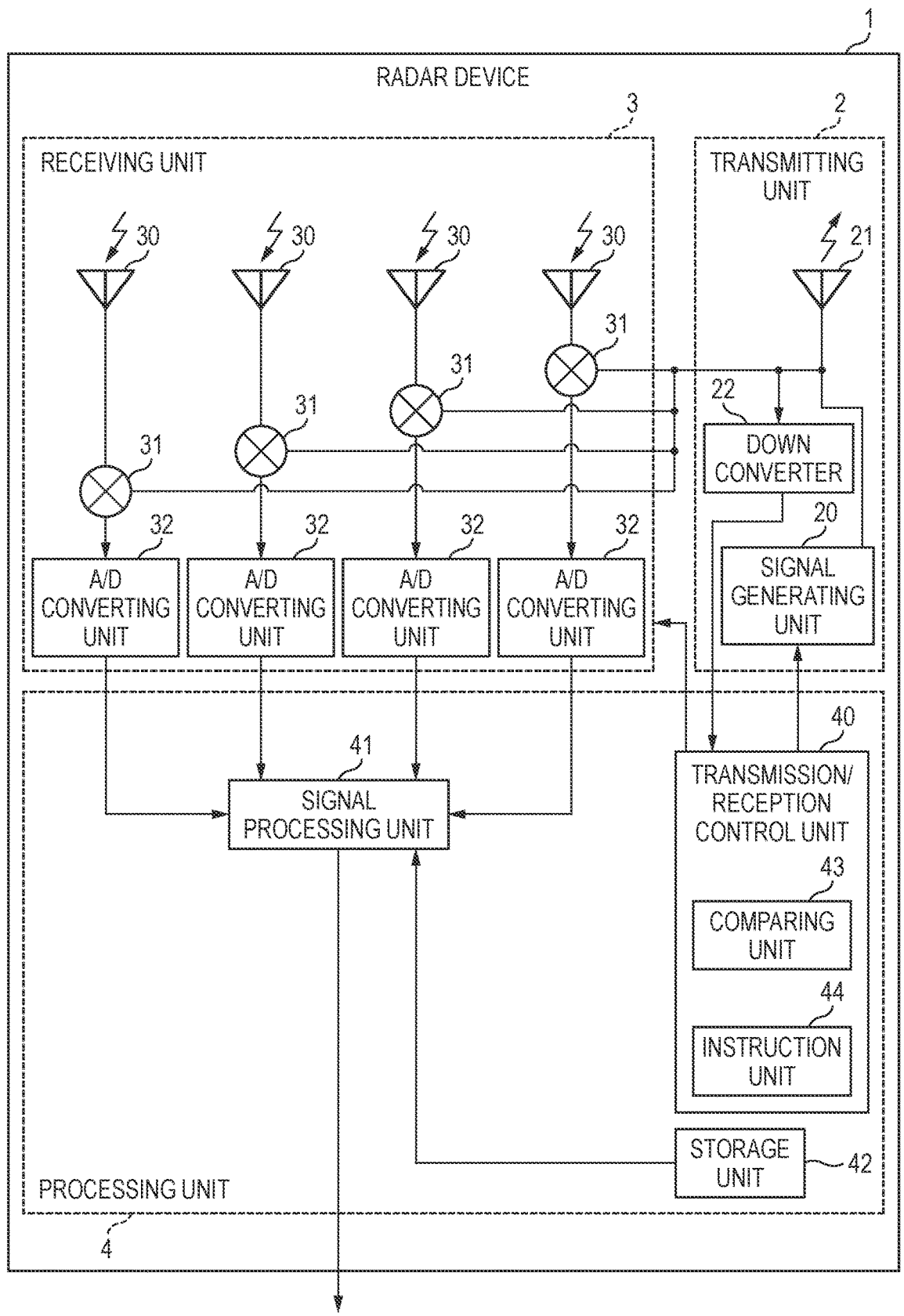
FIG. 11 is a block diagram showing a configuration of the radar device according to a fifth embodiment.

Next, the radar device 1 according to a fifth embodiment will be described with reference to FIG. 11. FIG. 11 is a block diagram showing a configuration of the radar device 1 according to the fifth embodiment. In the radar device 1 according to the fifth embodiment, the same reference numerals as those of the radar device 1 according to the first embodiment are given to the same configurations as those of the radar device 1 according to the first embodiment, and a detailed description thereof will be omitted. The signal generating unit 20 according to the fifth embodiment has the same configuration as the signal generating unit 20 according to the fourth embodiment shown in FIG. 9.

The radar device 1 according to the fifth embodiment is different from the radar device 1 according to the first embodiment in that the signal generating unit 20 does not output the signal to the transmission/reception control unit 40.

The comparing unit 43 compares the frequency of the transmitted signal with the predetermined frequency based on the frequency of the signal output from the down converter 22 at the output timing based on the sampling signal. The comparing unit 43 determines whether the frequency of the transmitted signal at the output timing matches the predetermined frequency. That is, the comparator 43 determines whether the predetermined timing is reached at the output timing.

The instruction unit 44 sets the frequency of the reference signal of the reference signal oscillator 23 such that the predetermined timing is reached at the output timing. For example, when the reference signal oscillator 23 is an oscillator using a crystal resonator, the transmission/reception control unit 40 sets a load capacity of the crystal resonator. The instruction unit 44 generates the instruction signal, outputs the instruction signal to the signal generating unit 20, and makes the signal generating unit 20 generate the transmitted signal.

Figure 12:
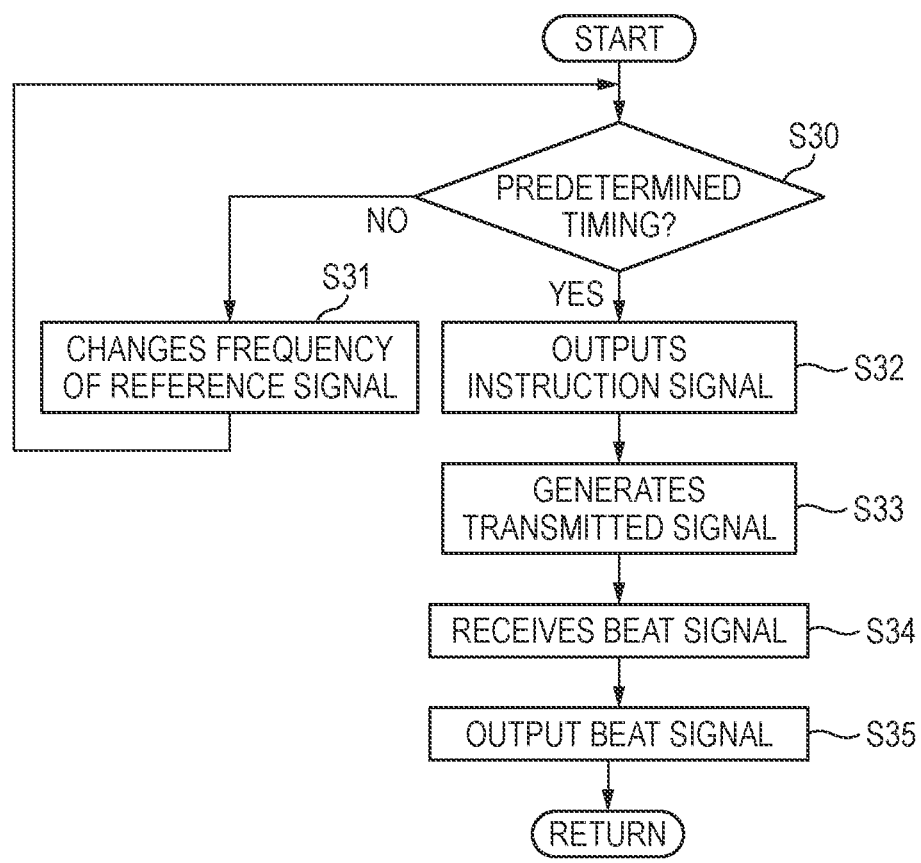
FIG. 12 is a flowchart illustrating the synchronization control in the radar device according to the fifth embodiment.

Next, synchronization control in the radar device 1 according to the fifth embodiment will be described with reference to FIG. 12. FIG. 12 is a flowchart illustrating the synchronization control in the radar device 1 according to the fifth embodiment.

The transmission/reception control unit 40 determines whether the predetermined timing is reached at the output timing (S30).

When the predetermined timing is not reached at the output timing (S30: No), the transmission/reception control unit 40 changes the frequency of the reference signal of the reference signal oscillator 23 such that the predetermined timing is reached at the output timing (S31).

When the predetermined timing is reached at the output timing (S30: Yes), the transmission/reception control unit 40 outputs the instruction signal based on a currently set frequency of the reference signal (S32). The signal generating unit 20 generates the transmitted signal based on the instruction signal (S33).

The A/D converting unit 32 captures the beat signal based on the sampling signal (S34) and outputs the beat signal converted into the digital signal to the signal processing unit 41 (S35).

Next, effects of the radar device 1 according to the fifth embodiment will be described.

The radar device 1 sets the frequency of the reference signal of the reference signal oscillator 23 such that the predetermined timing is reached at the output timing. Accordingly, the radar device 1 can match the predetermined timing to the output timing more easily than the radar device 1 according to the fourth embodiment and obtain the same effects as those of the first embodiment, for example, improving the detection accuracy of the target.

(Modification)

In the radar device 1 according to the fourth embodiment, the modulation waveform of the transmitted signal is set such that the predetermined timing is reached at the output timing, but the present invention is not limited thereto. The radar device 1 according to the modification may delay the timing of outputting the transmitted signal in the voltage-controlled oscillator 27. Accordingly, the radar device 1 according to the modification can obtain the same effects as those of the radar device 1 according to the fourth embodiment.

Further, the radar device 1 according to the modification can apply the configurations of the radar device 1 according to the second embodiment or the radar device 1 according to the third embodiment to the radar device 1 according to the fifth embodiment. That is, the radar device according to the modification may change the frequency of the reference signal of the reference signal oscillator 23 based on the frequency of the frequency-divided signal or the control voltage. Accordingly, the radar device 1 according to the modification can obtain the same effects as those of the radar device 1 according to the fifth embodiment.

Additional effects and modifications can be easily derived by those skilled in the art. For this reason, broader aspects of the present invention are not limited to the specific details and the representative embodiments shown and described above. Accordingly, various modifications can be made without departing from the spirit or scope of the general inventive concept as defined by the appended claims and equivalents thereof.

What is claimed is:

1. A radar device comprising:
a transmitter that transmits a transmission wave based on a transmission signal of which frequency is modulated;
a receiver that receives a reflected wave reflected by a target to acquire a reception signal based on the reflected wave, and which outputs a beat signal based on the transmission signal and the reception signal; and
at least one processor configured to control an output timing at which the beat signal is outputted by the receiver in accordance with a predetermined timing at which a frequency of the transmission signal becomes a predetermined frequency.

2. The radar device according to claim 1,
wherein the at least one processor sets the output timing in accordance with the predetermined timing.

3. The radar device according to claim 2,
wherein the transmitter generates the transmission signal by a phase synchronization circuit, and
wherein the at least one processor sets the output timing based on a frequency obtained by down-converting the transmission signal and a frequency of a reference signal of the phase synchronization circuit.

4. The radar device according to claim 2,
wherein the transmitter generates the transmission signal by a phase synchronization circuit, and
wherein the at least one processor sets the output timing based on a frequency of the transmission signal divided by the phase synchronization circuit and the frequency of a reference signal of the phase synchronization circuit.

5. The radar device according to claim 2,
wherein the transmitter generates the transmission signal by a phase synchronization circuit which includes a voltage-controlled oscillator, and
wherein the at least one processor sets the output timing based on a control voltage of the voltage-controlled oscillator.

6. The radar device according to claim 1,
wherein the at least one processor sets the predetermined timing in accordance with the output timing.

7. The radar device according to claim 6,
wherein the transmitter generates the transmission signal, and
wherein the at least one processor makes the transmitter generate the transmission signal such that the predetermined timing is in accordance with the output timing.

8. The radar device according to claim 7,
wherein the at least one processor sets a modulation waveform of the transmission signal.

9. The radar device according to claim 7,
wherein the at least one processor delays generation of the transmission signal.

10. The radar device according to claim 7,
wherein the transmitter generates the transmission signal by a phase synchronization circuit, and
wherein the at least one processor sets the frequency of the reference signal of the phase synchronization circuit.

11. The radar device according to claim 1,
wherein the transmitter transmits a chirp wave whose frequency continuously increases or decreases as the transmission wave.

12. A radar device comprising:
a transmitter that transmits a transmission wave based on a transmission signal of which frequency is modulated;
a receiver that receives a reflected wave reflected by a target to acquire a reception signal based on the reflected wave; and
at least one processor configured to synchronize a modulation timing at which a frequency of the transmission signal is lowered by modulation with a timing at which the reception signal is A/D converted.

13. A control method of a radar device comprising:
transmitting a transmission wave based on a transmission signal of which frequency is modulated;
receiving a reflected wave reflected by a target to acquire a reception signal based on the reflected wave; and outputting a beat signal, based on the transmission signal and the reception signal, at a timing in accordance with a predetermined timing at which a frequency of the transmission signal becomes a predetermined frequency.

14. A control method of a radar device, comprising:
transmitting a transmission wave based on a transmission signal of which frequency is modulated;
receiving a reflected wave reflected by a target to acquire a reception signal based on the reflected wave; and
synchronizing a modulation timing at which a frequency of the transmission signal is lowered by modulation with a timing at which the reception signal is A/D converted.

* * * * *